United States Patent [19]
Tien et al.

[11] Patent Number: 5,819,308
[45] Date of Patent: Oct. 6, 1998

[54] METHOD FOR BUFFERING AND ISSUING INSTRUCTIONS FOR USE IN HIGH-PERFORMANCE SUPERSCALAR MICROPROCESSORS

[75] Inventors: Chien-Kuo Tien, Taipei; Kun-Cheng Wu, Hsinchu; Dze-Chaung Wang, Nantou; Ching-Tang Chang, Taipei, all of Taiwan

[73] Assignee: Industrial Technology Research Institute, Hsinchu, Taiwan

[21] Appl. No.: 807,297

[22] Filed: Feb. 27, 1997

[51] Int. Cl.$^6$ ...................................................... G06F 12/00
[52] U.S. Cl. ...................... 711/108; 395/391; 395/800.23; 711/145
[58] Field of Search ...................................... 395/435, 452, 395/470, 472, 391, 800.23; 711/108, 125, 143, 145; 365/49

[56] References Cited

U.S. PATENT DOCUMENTS

| | | | |
|---|---|---|---|
| 5,285,527 | 2/1994 | Crick et al. | 711/118 |
| 5,499,204 | 3/1996 | Barrera et al. | 365/49 |
| 5,515,518 | 5/1996 | Stiles et al. | 395/586 |
| 5,532,693 | 7/1996 | Winters et al. | 341/51 |
| 5,555,392 | 9/1996 | Chaput et al. | 711/118 |

OTHER PUBLICATIONS

Zwie Amitai et al.; "Trends in Specialty Memories –from FIFOs to CAMs"; Northcon/93 Conference Record; pp. 200–202, 1993.

Raymond Heald et al.; "A 6-ns Cycle 256-kb Cache Memory and Memory Management Unit"; IEEE Journal of Solid-State Circuits, vol. 28, No. 11; pp. 1078–1083, Nov. 1993.

*Primary Examiner*—Parshotam S. Lall
*Assistant Examiner*—Kenneth R. Coulter
*Attorney, Agent, or Firm*—W. Wayne Liauh

[57] ABSTRACT

An improved method and apparatus for buffering and issuing instructions for use with superscalar microprocessors are disclosed. The method comprises the steps of: (a) obtaining an instruction buffer comprising a plurality of entries, each entry comprising a random access memory (RAM) portion and a content addressable memory (CAM) portion for storing result data and source operand tag, respectively, wherein the CAM portion also contains means for linking with an associated RAM portion and the result data contains an instruction; (b) providing a result bus capable of transmitting the result data and a result tag; (c) matching the result tag in the result bus with the source operand tag in the CAM, and writing the result data into the RAM portion of an entry if the result tag in the result bus matches the source operand tag of an associated CAM portion; and (d) issuing ready instructions and changing the source operand tag in a corresponding CAM in such a manner that the entry containing the CAM will be identified as an empty entry so as to all new instruction to be written thereto. Because instructions are stored in the RAM in an out-of-order, a linear systolic array is provided so as to keep the sequence of instructions in order. The linear systolic array, which can be easily compressed, allows the prioritization of instructions for issue among ready instructions, and the handling branch mis-prediction and faults to be implemented.

8 Claims, 9 Drawing Sheets

METHOD FOR BUFFERING AND ISSUING INSTRUCTIONS FOR USE IN HIGH-PERFORMANCE SUPERSCALAR MICROPROCESSORS

FIELD OF THE INVENTION

The present invention relates to an improved method and apparatus for buffering and issuing instructions. More specifically, the present invention relates to an improved method and apparatus for buffering and out-of-order instruction issuing for use in high-performance superscalar microprocessors.

BACKGROUND OF THE INVENTION

In the implementation of out-of-order instruction issuing in superscalar microprocessors, instructions must be buffered before they are issued. Various techniques have been proposed for buffering and issuing instructions. Torng, in an article entitled: "An Instruction Issuing Mechanism for Performance Enhancement," School of Electrical Engineering Technical Report EE-CEG-84-1, Cornell University, Ithaca, N.Y. (1984), proposed a method by which a dispatch stack 30, as shown in FIG. 1, is utilized for such out-of-order instruction issue. In that method, the dispatch stack keeps unissued instructions in the order in which the instructions were originally decoded. The older instructions are stacked in the bottom of the stack. When an instruction is issued, the stack is compressed by filling those locations that have just been issued with "old" (i.e., existing) instructions that are waiting to be issued, and then making available entries at the top of the stack for receiving new instructions from the decoder 20. This process is illustrated in FIG. 1. Although this method simplifies the process of prioritizing among ready instructions, the steps involved in compressing the stack and allocating the new entry window can be very complex. Furthermore, it requires that each entry in the stack be constructed such that it can receive the contents of any "newer" entry (as shown in FIG. 1, the four entries at the bottom of the stack respectively receive the contents of I1, I4, I5, and I7 that were in other entries of the stack), and that it can receive an instruction from any position in the decoder. Moving the entire contents from cell to cell for a multiplicity of entries so as to achieve the purpose of compressing the buffer window can require quite substantial efforts, in both the implementation process itself and the hardware requirement for such implementation.

Sohi, et al., in an article entitled "Instruction Issue Logic for High Performance Interruptable Pipelined Processor," Proceedings of the 14th Annual Symposium on Computer Architecture, pp. 27–34 (1987), proposed a simplified method which utilizes a centralized window to avoid the complexity of having to compress the window. This method, which is called register update unit (RUU), operates as a FIFO buffer in which the decoded instructions are placed at the top of the FIFO. FIG. 2 illustrates the operation of the FIFO buffer proposed by Sohi, et al. Unlike the dispatch stack of Torng, the register update unit allocates and frees buffer entries strictly in a FIFO order. Instructions are entered at the top of the FIFO 40, and an entry is removed when it reaches the bottom of the FIFO. Because no compression is involved, the FIFO buffer is much simplified. However, it also suffers from two major disadvantages. First, some window entries may be occupied by instructions that have been issued (such as instructions I2, I3, and I6), resulting in an inefficient utilization of window entries. Secondly, the decoder 30 will be stalled if an instruction that has reached the bottom of the register update unit is not issued (for example, FIG. 2 shows that instructions I9I-11 remain in the decoder).

SUMMARY OF THE INVENTION

The primary object of the present invention is to develop an improved method for buffering and issuing instructions for use in high-performance superscalar microprocessors. More specifically, the primary object of the present invention is to develop an improved method for buffering and out-of-order issuing of instructions for use in high-performance superscalar microprocessors which allows an efficient usage of the buffer while avoiding delays in instruction issuing and the complicated window compression procedure.

In the method disclosed in the present invention, the buffer is constructed to contain a RAM (random access memory) module and a CAM (content addressable memory) module, which are provided for instruction storage and result write-back, respectively. The sequence of instructions stored in the entries in the RAM module can be, and typically is, out-of-order. However, the present invention utilizes a linear systolic array which maintains the pointers to the entries in the RAM module, so as to keep the instruction sequence in-order. By using this novel combination, the present invention allows the buffer entries that have been issued to be utilized without requiring the complicated compressing procedure. Thus the method disclosed in the present invention combines the advantages of the dispatch stack (as taught by the Torng reference) and the registered update unit (the Sohi reference) methods discussed above, while eliminating the disadvantages thereof.

As discussed earlier, in an out-of-order issue superscalar microprocessor, instructions must be buffered before they can be issued. The instruction buffer disclosed in the present invention, which is called a reservation station-or RS, performs the following operations:

1. Matching result tags from the result bus for result rewrite;
2. Identifying entries in the buffer containing instructions that are ready for issue;
3. Among all ready instructions, selecting instructions for issue, typically based on requirements from functional units and an "oldest first" policy;
4. Issuing those selected instructions to appropriate functional units;
5. Deallocating issued entries so that these entries may now receive new instructions; and
6. Handling branch mis-predictions and faults.

In a preferred embodiment of the buffer organization disclosed in the present invention for instruction storage, the entries in the RAM module are provided to hold opcode, source operands, source flags, destination tags, etc. The entries in the CAM are provided to hold operand source tags associated with respective entries in the RAM. When there is a match between the result tag and the operand source tag (in the content-addressable memory), the result is written into the desired entry in the RAM (as operation 1 discussed above). Each entry in the RAM may evolve through three states: an "empty" state, a "login" state, and a "ready" state. An empty state indicates that the entry does not hold any instruction. A login state indicates that the entry holds an instruction. And a ready state means that not only an instruction has been written into that entry, it is also ready for issue.

In the present invention, new instructions can "login" (i.e., they are "logged into") the instruction buffer by writing into empty RAM entries (with the aid of CAM). Pointers linking these RAM entries are stored in the linear systolic array. In a preferred embodiment, the empty and ready entry pointers are obtained (i.e., set) using two priority encoders, which set appropriate pointers to empty and ready pointers, respectively, by the use of the valid bit and the ready bit provided in each cell in the linear systolic array. The memory pointers associated with new login instructions are placed at the left-most available cells (i.e., near the entrance) of the linear systolic array through login signals, which are also generated by a priority encoder. The linear systolic array also stores pointers corresponding to ready instructions (i.e., instructions that are ready for issue). Cells of the linear systolic array that contain pointers associated with issued instructions are filled with "old awaiting instructions" cells or freed/empty cells via a shifting mechanism. Pointers associated with freed memory entries (i.e., those instructions that have been just issued) are written back to the very bottom (i.e., the right-most) of the array. All these steps, which complete operations 2 through 5 of the reservation station of the present invention, are completed within one clock cycle. Since only pointers are moved, the present invention allows a much more simplified and requires much less hardware requirement than the dispatch stack method taught in the prior art.

BRIEF DESCRIPTION OF THE DRAWING

The present invention will be described in detail with reference to the drawing showing the preferred embodiment of the present invention, wherein.

DETAILED DESCRIPTION OF THE PREFERRED EMBODIMENT

Figure 1:
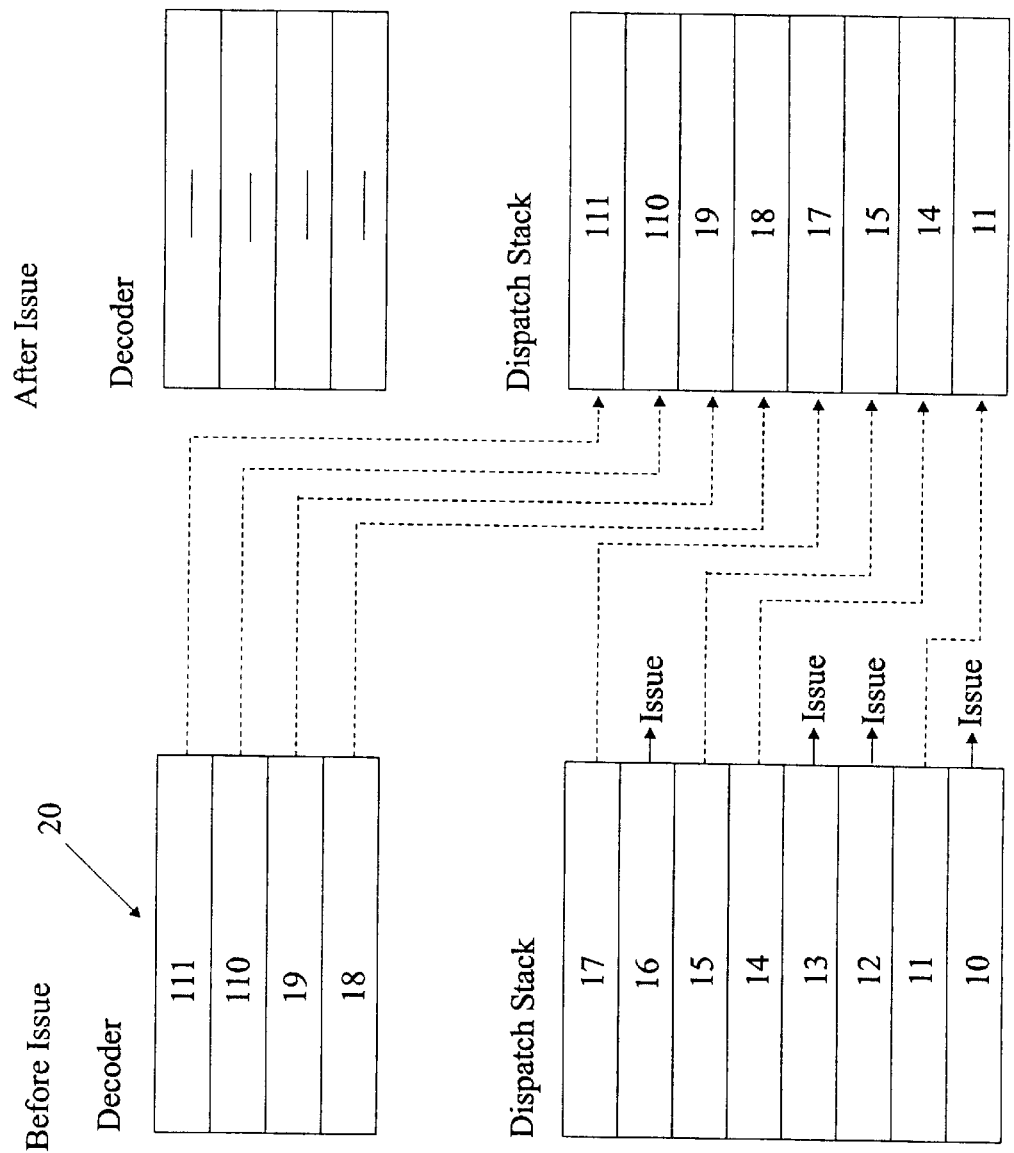
FIG. 1 is an illustrative diagram showing the operation of a prior art dispatch stack method which involves a compression mechanism.
Figure 2:
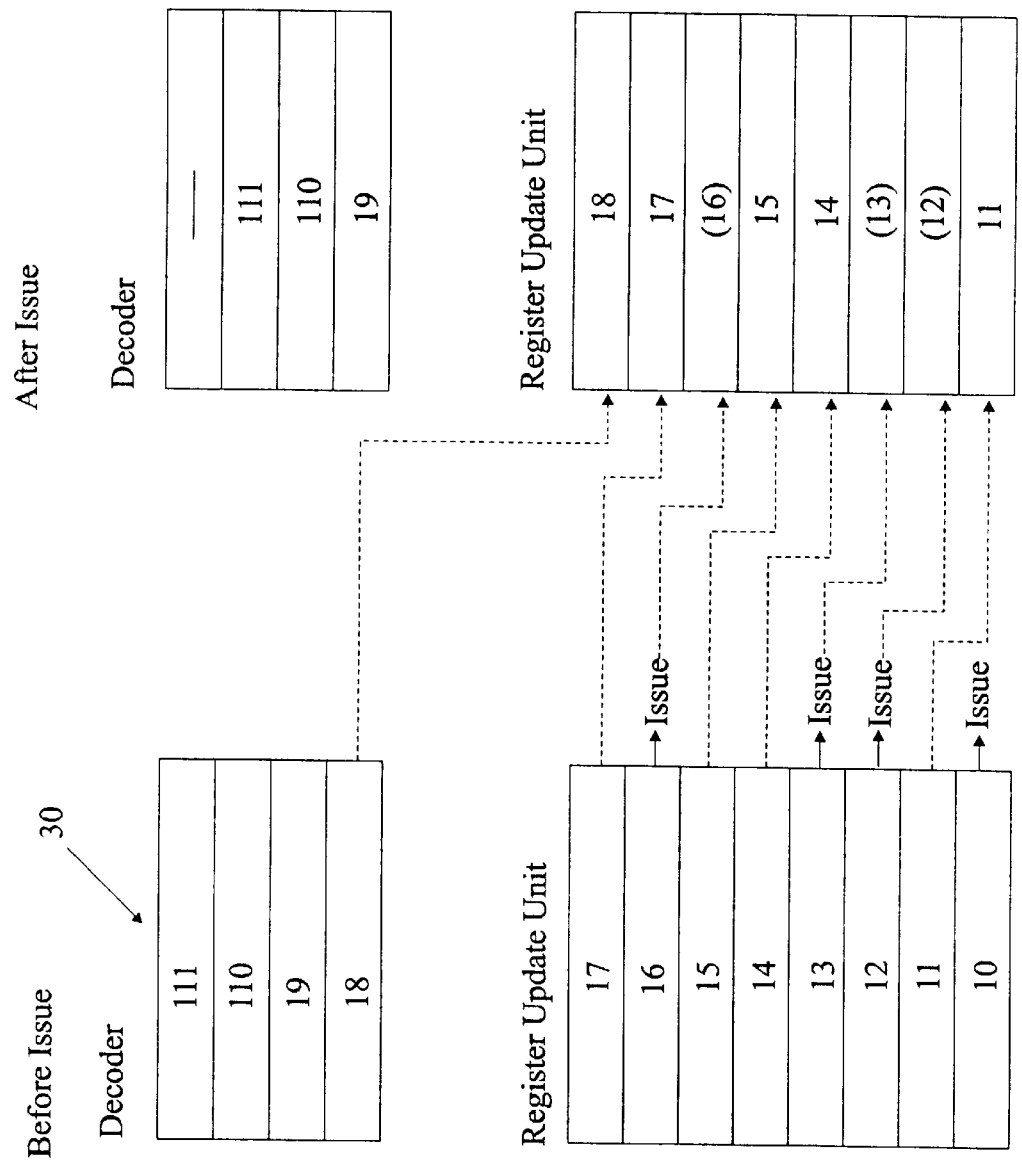
FIG. 2 is an illustrative diagram showing the operation of a prior art resister update unit method which is managed as a FIFO.

The present invention discloses a novel and improved method for buffering and issuing instructions for use in high-performance superscalar microprocessors which allows the most efficient usage of the buffer space while eliminating delays in instruction issuing and avoiding the complicated procedure involved in compressing the buffer window.

An instruction, after the decoder, can only be written into an empty entry in the instruction buffer. An entry in the buffer will become empty after it becomes ready and the instruction contained therein is issued. After each clock cycle, there will be two types of empty entries, or cells, in the buffer—those that are just issued (i.e., newly empty cells) and those that were already empty (i.e., "older" and "waiting for instructions"). To facilitate the buffer operations, conventionally, it is desirable to move the empty cells (of either kind) to the top of the buffer, so that they can be put in positions for receiving newly decoded instructions. Two methods have been disclosed in the prior art to achieve this purpose. One method involves a dispatch stack utilizing a compression mechanism and the other method, which is called a register update unit, operates as a FIFO buffer. As discussed heretofore, the compression procedure in the dispatch stack method often involves very complicated operations; whereas, the register update unit does not provide very efficient usage of the buffer space and may involve some delays in instruction issuing.

In the present invention, a novel method is disclosed which is radically different from any of the prior art methods. In the method disclosed in the present invention, the empty cells do not need to be moved to the top of the buffer. Indeed, none of the cells need be moved at all. Rather, each entry (i.e., cell) in the buffer is constructed to have a RAM (random access memory) portion and a CAM (content addressable memory) portion. In the preferred embodiment of the present invention, the RAM portion stores the main body of the instruction, such as opcode, source operands, source flags, and destination tags, etc. The CAM portion stores a source operand tag. The very nature of the CAM provides that, whenever there is a match between a result tag of an instruction that has been executed and the source operand tag of a CAM, the result of the executed instruction is written into the associated RAM of the same entry. Thus the present invention does not require the empty entries to be moved to the top of the buffer in order for them to receive instructions. In summary, in the present invention, the CAM portion of the buffer allows newly decoded instructions to be written into (the "login" operation) the RAM portion of empty cells. Unlike any of the prior art method, the entries in the buffer window are not moved. Instead, it is the pointers, which are stored in a linear array, that are compressed so as to select (prioritize) instructions for issue among ready instructions, as well as handle branch misprediction and faults.

Because, in the present invention, the decoded instructions can go into any empty entry in the buffer, the RAM does not necessarily hold instructions in the sequence they are decoded. In order to keep the instruction sequence in-order, a linear systolic array is provided in the present invention which contains pointers to the entries of the RAM. Unlike their associated entries in the RAM, the pointers in the linear systolic array are maintained in-order, so that prioritizing among ready instructions and branch predictions can be easily performed. The linear systolic array can be compressed using conventional techniques. However, because it is the pointers and not the instructions that are being compressed, the procedure involved in the present invention is much more simplified and requires much less hardware than those disclosed in the prior art.

Figure 3:
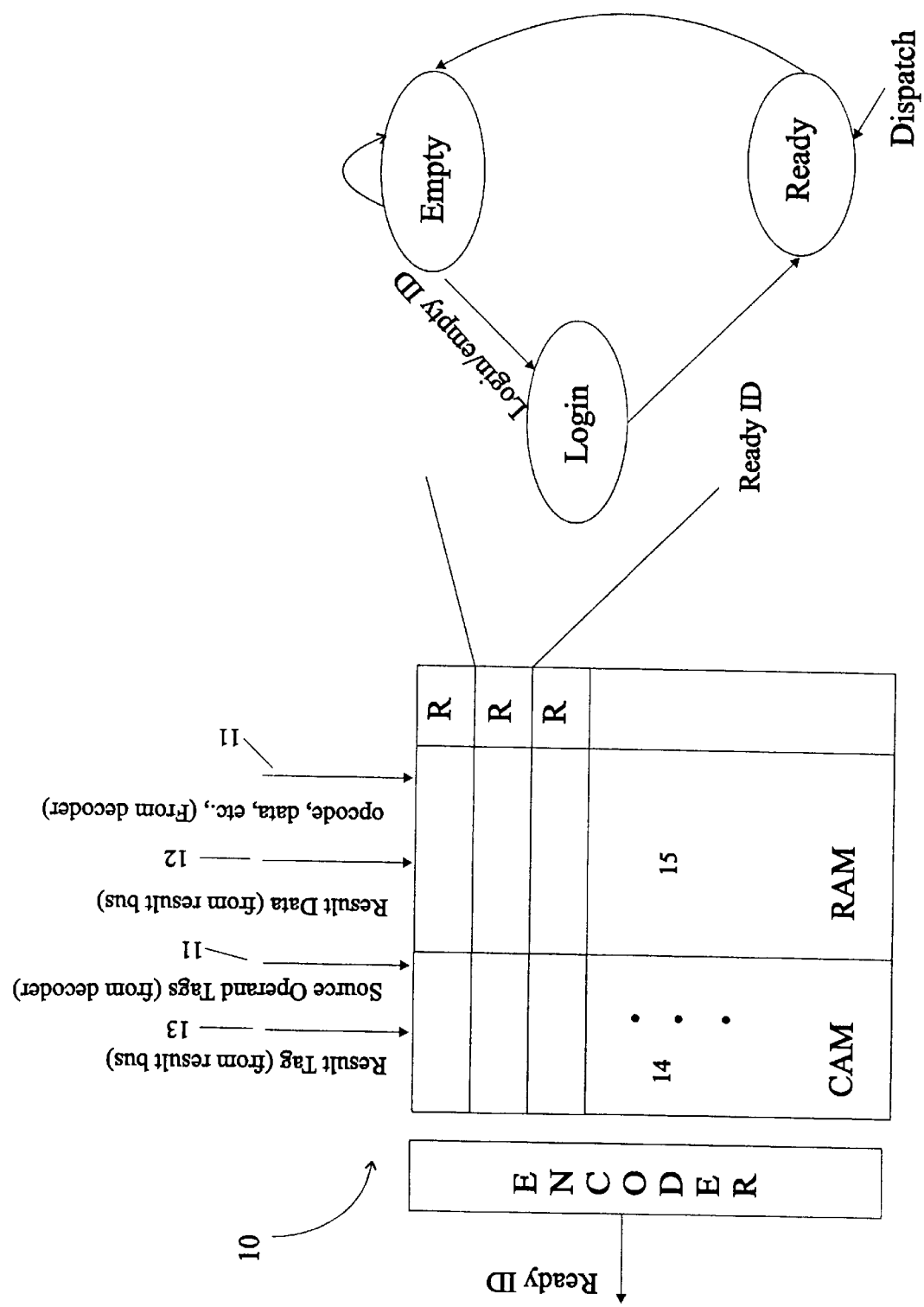
FIG. 3 is a schematic drawing illustrating the buffer organization and the "state transition" of each entry in the buffer, according to a preferred embodiment of the present invention.
Figure 3A:
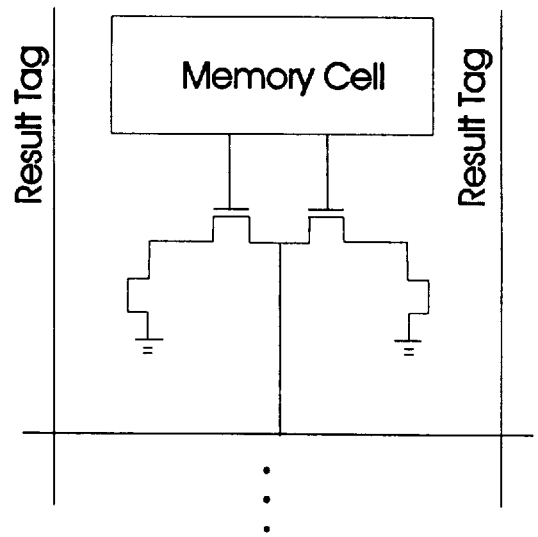
FIG. 3a is a schematic drawing of the CAM portion of the instruction buffer.
Figure 3B:
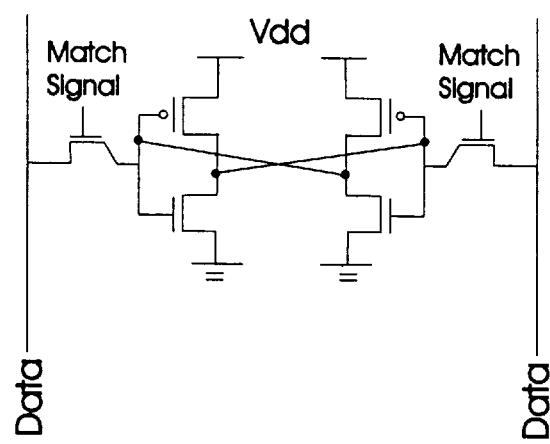
FIG. 3b is a schematic drawing of the RAM portion of the instruction buffer.

Now refer to the drawings. FIG. 3 shows a schematic drawing illustrating the buffer organization according to a preferred embodiment of the present invention. The result bus (from execution functional unit) is structured to contain result data (i.e., instruction) 12 and result tag 13. The instruction buffer 10, which is called a reservation station ("RS"), of the present invention is constructed to comprise a RAM portion 14 for storing result data and a CAM portion 15 for storing source operand tag for associating with a RAM entry. In an example according to a preferred embodiment of the present invention, the RAM fields comprise Opcode, Rdtag (destination tag), RS1Data and RS2Data (both are source operands); and the CAM fields comprise RS1Tag and RS2Tag (source operand tags). When the result tag 13 in the result bus matches the source operand tag R of the CAM, the result data 12 will be written into the associated RAM portion of the entry.

FIG. 3 also shows that the status of the entry ("R") may evolve through three states, empty, login, and ready states, as the processor is running. An empty state indicates that the entry does not hold any instruction. This includes two possibilities: the cell can be already empty prior to the immediate past clock cycle ("old waiting for instruction"), or it can just become empty ("freed/emptied") after the immediate past clock cycle. A "login" state indicates that the entry holds instruction but not ready for issue. A "ready" state indicates that the entry not only holds instruction, but it is also ready for issue.

In FIG. 3, the "R" indicates that status of the instruction buffer, including, as discussed above, the empty, login, and ready states. An empty indicates that the instruction buffer is empty, thus allowing new instruction to be written thereinto. A login state indicates that the particular entry contains an instruction, but is not ready to be transmitted out. And a ready state indicates that the instruction contained in that entry is ready to be transmitted out. The status "R" of an instruction buffer entry is not stored in that instruction buffer. Rather, it is an indication of the V (valid) and R (ready) bits of the linear systolic array (as shown in FIG. 4a). Since the key element of the present invention is to use a coupled-CAM-and-RAM in the instruction buffer, this and other ancillary features will not be discussed in detail to provide clarity of the disclosure.

Because instructions (result data) are not stored in the RAM on an in-order basis, the present invention also contains a linear systolic array to allow prioritizing among the ready instructions and to handle branch mid-predictions. The novel combination of RAM, CAM, and linear systolic array disclosed in the present invention provides the advantages of both the dispatch stack method and the register update unit without incurring the disadvantages thereof. The design of the linear systolic array is well-known in the art, thus it will only be briefly described here. FIG. 4a is a schematic drawing illustrating the design of a linear systolic array according to a preferred embodiment of the present invention which is provided to maintain the instruction sequence in-order. Two priority encoders are provided to set empty and ready entry pointers (i.e., pointers that are pointing to empty and ready entries, respectively). These encoders set the pointers as empty and ready pointers using the validity bit (V) and ready bit (R) for empty and ready entry pointers, respectively. The memory pointers associated with new login instructions are placed at the left-most available cells of the array. In FIG. 4a, ADDR holds the pointers of the RAM entry in the instruction buffer. A "1" in the V bit indicates that the pointer is linked to a memory entry which holds an instruction. The V bit can be set by the login signal. A "1" in the R bit indicates that the pointer is linked to a memory entry which not only holds an instruction but also is ready for issue. The R bit can be set by comparing the Ready ID generated by the match signal of the CAM with the pointer (i.e., ADDR) in every cell.

Figure 4:
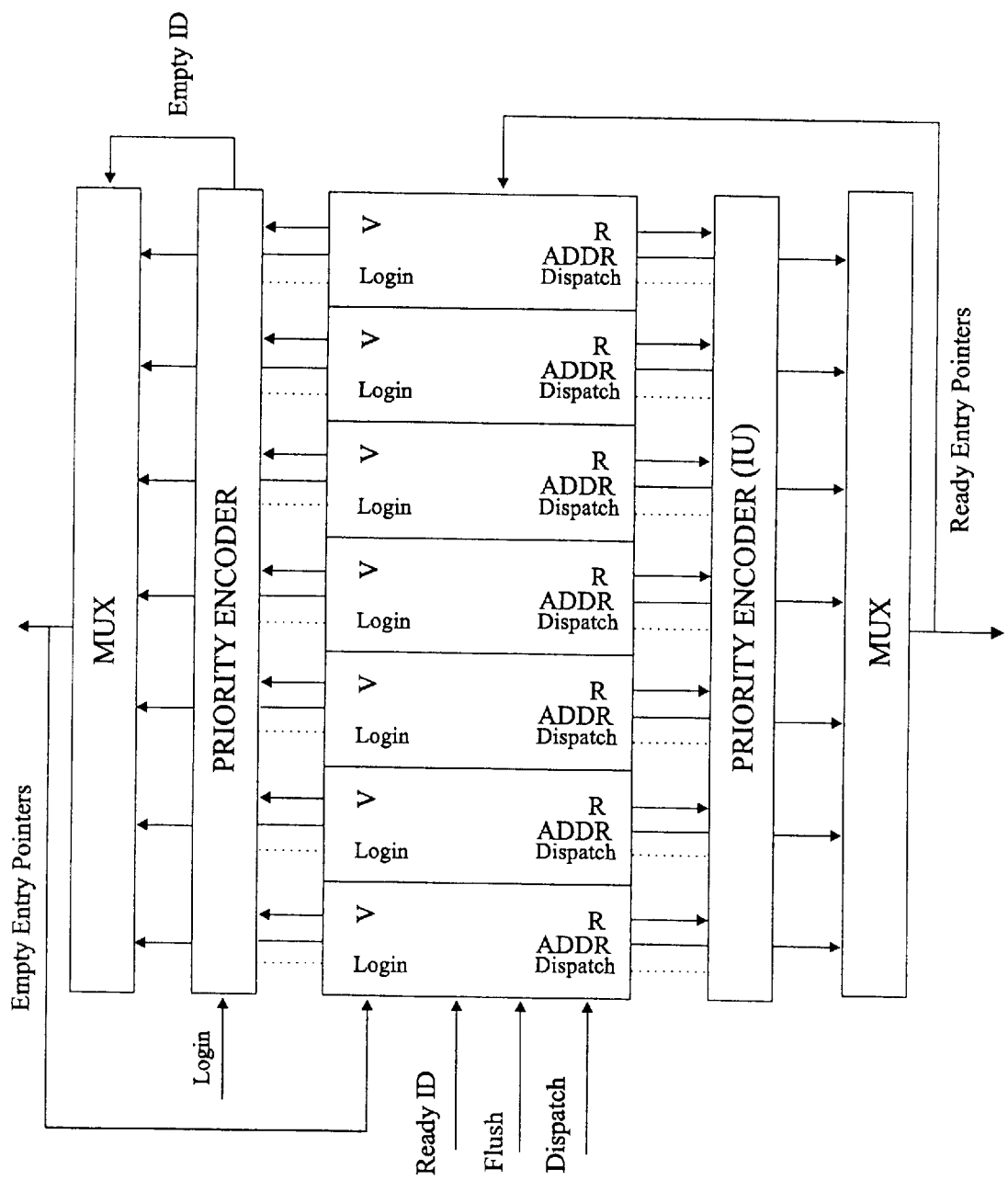
FIG. 4 provides a flowchart of the operation of a superscalar microprocessor according to a preferred embodiment of the present invention.
Figure 4A:
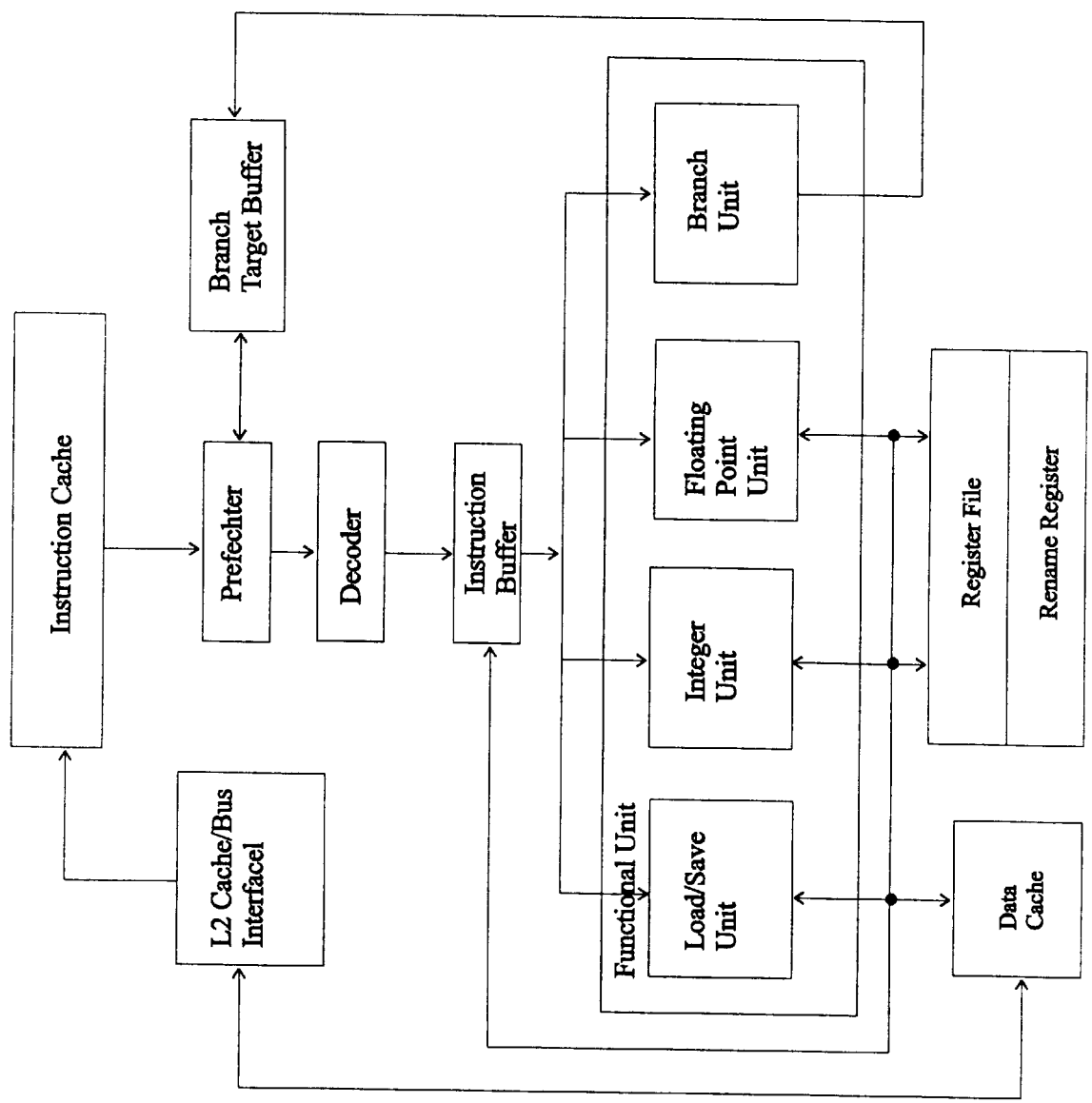
FIG. 4a is a schematic drawing illustrating the design of a linear systolic array according to a preferred embodiment of the present invention which is provided to maintain the instruction sequence in-order.

FIG. 4 provides a flowchart of the operation of the linear systolic array. Basically, the instruction is first decoded. After decoding, the source operand tag, the opcode, and data are sent to the instruction buffer of the present invention, via a Login command. The source operand tag is sent to the CAM portion, and the opcode, data are sent to the RAM portion. After the instruction is executed by the functional units, the result tag and the result data will be sent to the result bus, then to the instruction buffer (again, the source operand tag is sent to the CAM portion, and the opcode, data are sent to the RAM portion). After the CAM portion of the instruction buffer entry detects a match between the result tag from the result bus and the source operand tag from the instruction decoder, then the "result data" from the result bus will be overwritten to its associated RAM portion. At this stage, this particular entry "acquires" a ready state. And the instruction buffer will send, via a simple encoder, the "Ready ID" of this ready entry to the linear systolic array. The Ready bit corresponding to that newly ready entry will be set to 1. (FIG. 6 also shows that when the Ready ID matches the ADDR, the Ready bit will be set to 1.) Again, since the key element of the present invention is to provide a novel coupled-CAM-and-RAM in the instruction buffer, the operation of the linear systolic array will not be discussed in detail.

Figure 5:
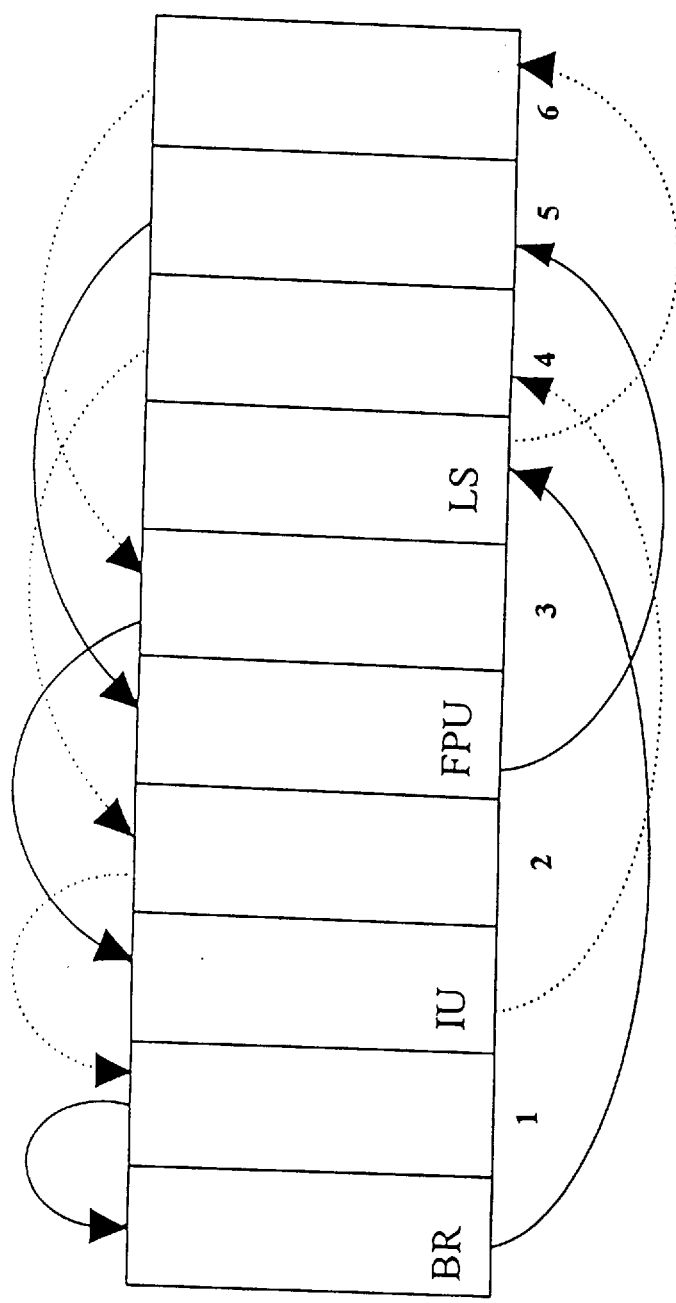
FIG. 5 is a schematic drawing illustrating an example of instruction issue according to a preferred embodiment of the present invention.
Figure 5A:
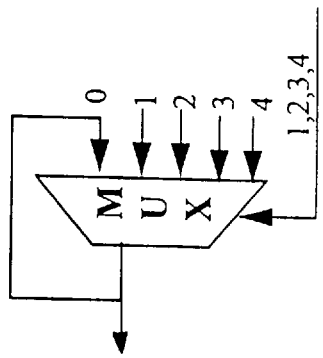
FIG. 5a is a iconic representation of a shifting mechanism to achieve cell compression.

Cells in the linear systolic array can be compressed. One of the key differences of the present invention relative to the prior art method is that the present invention only moves cells containing pointers, instead of the entire instruction. Thus the present invention is much easier for implementation while providing all the advantages of the prior art method. FIG. 5 is a schematic drawing illustrating an example of the instruction issue and pointer cells compression during one clock cycle according to a preferred embodiment of the present invention. Again, the compression technique is also well-known in the art, thus, it will not be described in detail here. FIG. 5 shows that there were four cells in the linear array containing pointers linking to RAM entries that stored the "BR", "IU", "FPU", and "LS", instructions, respectively, that were ready to issue. FIG. 5 also shows cells 1 through 6 that were linking to login RAM entries but were not ready for issue. After these instructions were issued, these entries became empty entries, and the corresponding cells in the linear systolic array also became empty. During the same "shifting" operation, cell 1 (i.e., the content of cell 1) moves into cell "BR" (i.e., the cell that contains pointer linking to instruction "BR"); cell 2 moves into cell 1, which recently became empty; cell 3 moves into cell "IU"; cell 4 moves into cell 2; cell 5 moves into cell "FPU"; cell 6 moves into cell 3. In FIG. 5, the solid curve indicates the move of a pointer entry into an already empty cell, and dashed curve indicates the move of a pointer entry into an empty cell that just became empty because its entry was moved to another empty cell. Also, the ADDR (pointer) of the issued instructions (i.e., BR, IU, FPU, LS) are moved to the right-most of the array, serving as new empty cells. FIG. 5a is a iconic representation of the shifting mechanism to achieve the cell compression in the systolic array in one clock cycle.

Figure 6:
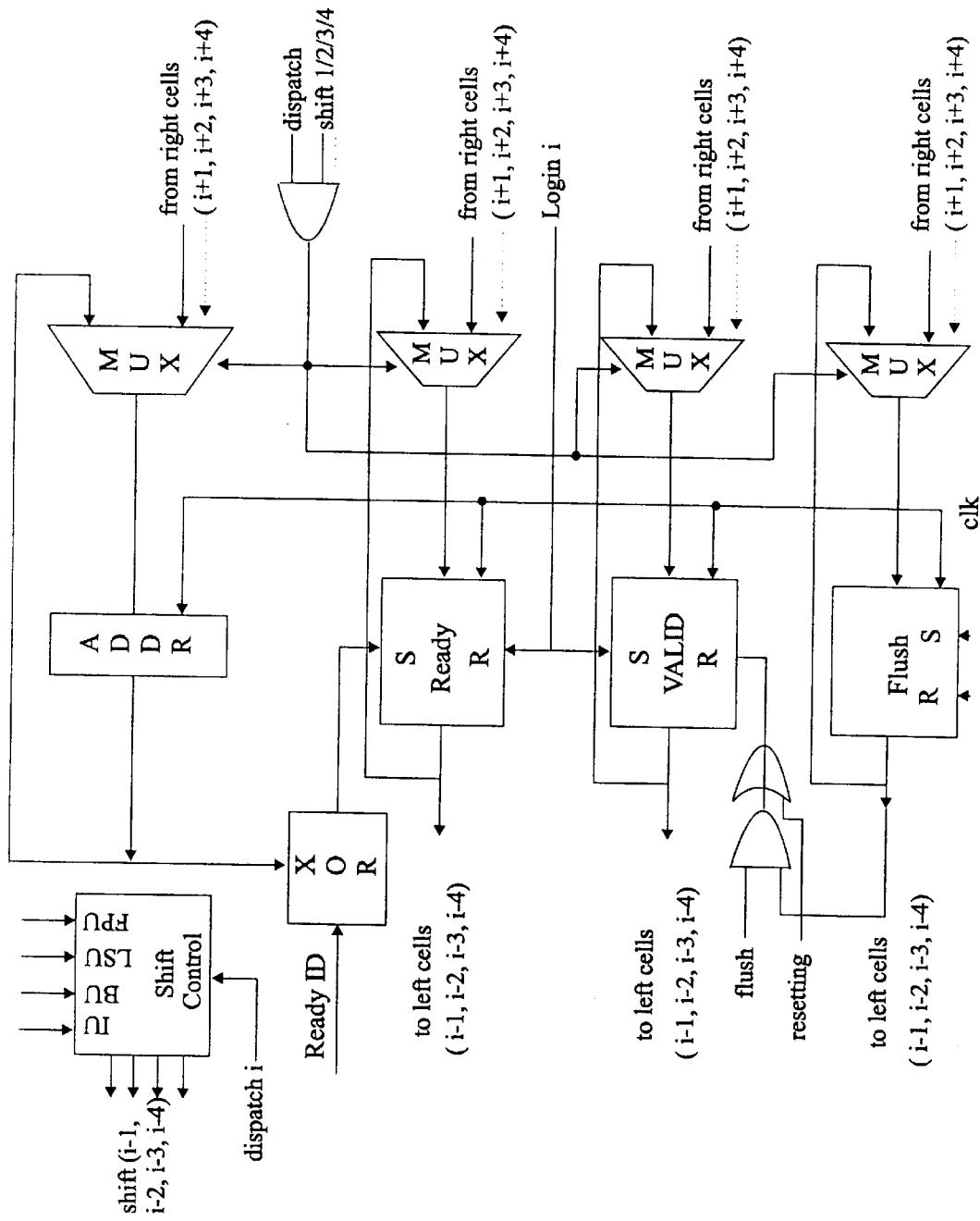
FIG. 6 is a schematic drawing showing the cell logic of a cell in the linear systolic array of the present invention.

FIG. 6 is a schematic drawing showing the cell logic for shifting the content of a cell in the linear systolic array of the present invention. In a preferred embodiment as shown in FIG. 6, every cell in the linear systolic array contains four storage elements: ADDR (pointer), Ready bit (R), validity bit (V), and Flush bit. The cell logic as shown in FIG. 6 is typically described, in a shorthand notion, as an "icon" shown in FIG. 5a. The cell logic shown in FIG. 6 is self-explanatory, and will not be discussed in detail in this disclosure. Basically, in the example shown in FIG. 6, each storage element has a multiplexer (MUX) provided at the input thereof. The multiplexer in this example has five input sources: output from cell i itself plus output from the four cells to its right. The select signal of the MUX is set up a shift control logic. The cell logic shown FIG. 6 causes the filled cells (i.e., those containing pointers corresponding to RAM entries that were waiting to become ready and pointers corresponding to RAM entries that were ready to issue) to be shifted to the left, and the empty cells corresponding to RAM entries of issued instructions to be shifted to the right-most of the array. The functions of the storage elements are explained below:

1. ADDR: holds the pointers of the memory entry.
2. Validity (V): a "1" in the V bit indicates that this cell's pointer is linked to a memory entry which holds an instruction; it is set by the login signal.
3. Ready (R): a "1" in the R bit indicates that this cell's pointer is linked to a memory entry which not only holds an instruction but also is ready for issue; it is set by a comparison between the ReadyID generated by the match signal of the CAM, and the pointers in all the cells.
4. Flush: whenever a branch instruction is issued, the Flush bits in all the cells behind the branch instruction are set to one. Once a branch mis-prediction is detected, a flush signal invalidates all the instructions which have the "valid" bit set to one (i.e., behind the branch instruction).

Figure 7:
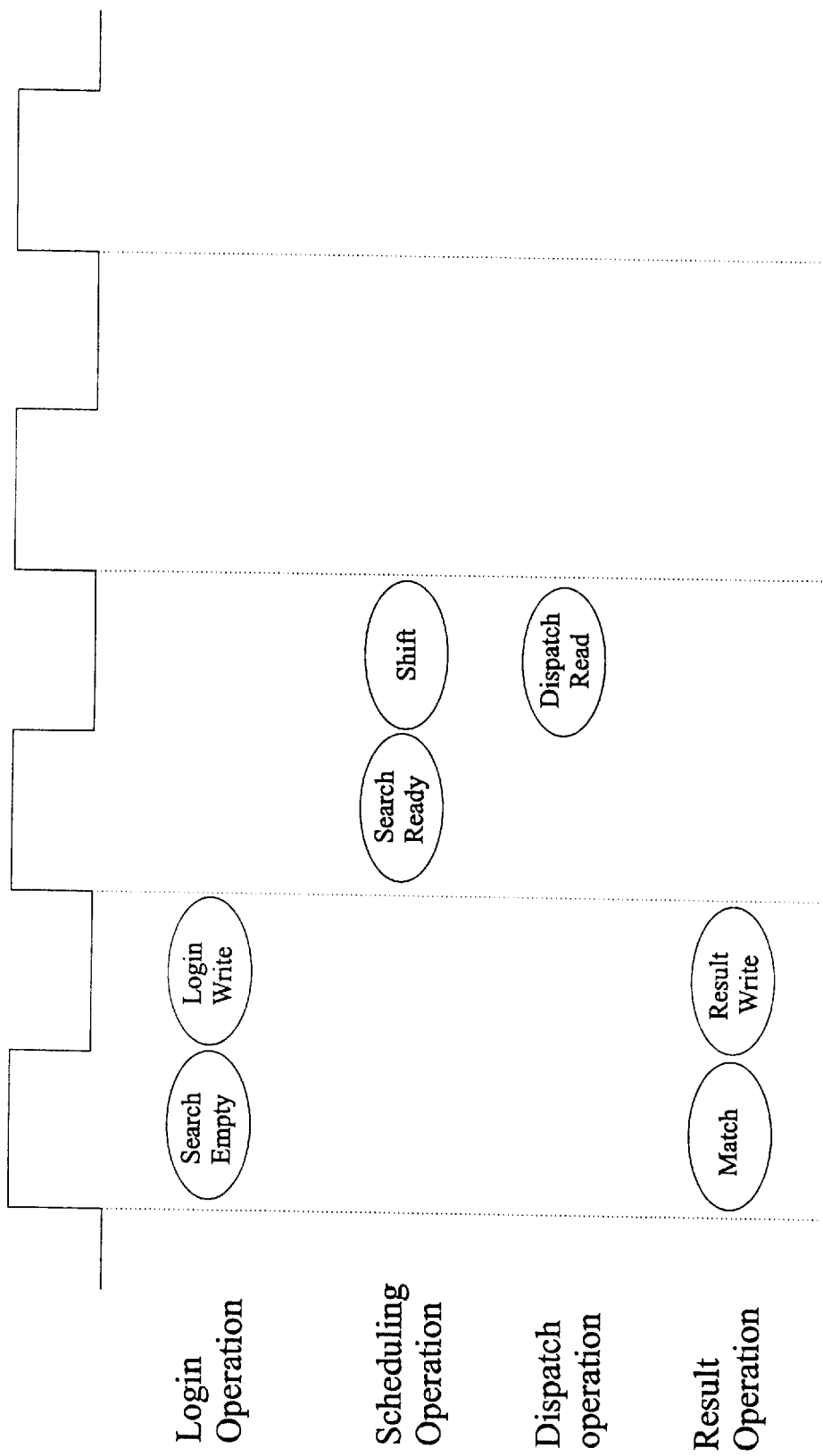
FIG. 7 is a timing chart for the operation of the instruction buffer according to a preferred embodiment of the present invention.

FIG. 7 is a timing chart for instruction buffer according to a preferred embodiment of the present invention. Basically, the present invention provides a decoupled design for instruction login, scheduling, and issue. The decoupled design of the present invention allows the empty and ready entries to be found. The instruction sequence is kept in-order using a linear systolic array which is external to the decoupled instruction buffer. The linear systolic array also provides means for handling branch mis-predictions.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method for buffering and issuing instructions for use with out-of-order instruction issuing superscalar microprocessors, comprising the steps of:

(a) obtaining an instruction buffer comprising a plurality of entries, each entry comprising a random access memory (RAM) portion and a content addressable memory (CAM) portion for storing result data and source operand tag, respectively, wherein said CAM portion also contains means for linking with an associated RAM portion and said result data contains at least a portion of an instruction;

(b) providing a result bus capable of transmitting said result data and a result tag;

(c) matching said result tag in said result bus with said source operand tags in said CAMs, and writing said result data into a RAM portion of an identified entry if said result tag in said result bus matches with said source operand tag of an associated CAM portion of the same entry; and (d) issuing ready instructions and changing a status of said associated CAM portion of said identified entry in such a manner that said identified entry will be identified as an empty entry so as to allow a new instruction to be written thereto;

said method further comprises the steps of:

(e) obtaining a linear systolic array containing a plurality of pointer entries, each of said pointer entries comprises an address portion for storing a pointer associated with a RAM entry in said instruction buffer, and a status portion for storing a status of said associated RAM entry, wherein said status of a RAM is determined by a source operand tag of a CAM portion associated therewith;

(f) setting said status portion for each of said pointer entries in accordance with said status of said associated RAM entry; and (g) compressing said linear systolic array by moving pointer entries having an empty status to locations of said linear systolic array closest to an entrance of said linear systolic array.

2. The method for buffering and issuing instructions according to claim 1 wherein said instruction contains opcode, destination code, and source operand code, and said means for linking said CAM portion with an associated RAM portion employs said source operand tag.

3. The method for buffering and issuing instructions according to claim 1 wherein said status portion of said pointer entry comprises a validity bit and a ready bit, whose values are to be set by a login signal and a comparison between a Ready ID and said pointer, respectively.

4. The method for buffering and issuing instructions according to claim 3 wherein said status portion further comprises a flush bit so as to allow mispredictions to be handled.

5. A reservation station for use with superscalar microprocessors for buffering and issuing instructions, comprising:

(a) an instruction buffer, which comprises a plurality of entries, each entry comprises a random access memory (RAM) portion and a content addressable memory (CAM) portion for storing result data and source operand tag, respectively, wherein said CAM portion also contains means for linking with an associated RAM portion and said result data contains an instruction;

(b) a result bus capable of transmitting said result data and a result tag of an executed instruction;

(c) means for matching said result tag in said result bus with said source operand tag in said CAM, and writing said result data into said RAM portion of an entry if said result tag in said result bus matches said source operand tag of an associated CAM portion; and (d) means for issuing ready instructions and changing a status of a corresponding CAM in such a manner that said entry containing said CAM will be identified as an empty entry so as to allow a new instruction to be written thereto;

said reservation further comprises:

(e) a linear systolic array containing a plurality of pointer entries, each of said pointer entries comprises an address portion for storing a pointer associated with a RAM entry in said instruction buffer, and a status portion for storing a status of said associated RAM entry, wherein said status of a RAM is determined by a source operand tag of a CAM portion associated therewith;

(f) means for setting said status portion for each of said pointer entries in accordance with said status of said associated RAM entry; and (g) means for compressing said linear systolic array by moving pointer entries having an empty status to locations of said linear systolic array closest to an entrance of said linear systolic array.

6. The reservation station for buffering and issuing instructions according to claim 5 wherein said instruction contains opcode, destination code, and source operand code, and said means for linking said CAM portion with an associated RAM portion employs said source operand tag.

7. The reservation station for buffering and issuing instructions according to claim 5 wherein said means for setting said status portion of said pointer entries comprises:

(a) a login signal and a comparison between a ready ID and pointer address; and (b) a validity bit and a ready bit, whose values are to be set by respectively.

8. The reservation station for buffering and issuing instructions according to claim 7 wherein said status portion further comprises a flush bit so as to allow mis-predictions to be handled.

\* \* \* \* \*